Oct. 9, 1934.　　　A. Y. DODGE　　　1,976,060
LUBRICATING DEVICE
Filed April 20, 1932　　2 Sheets-Sheet 2
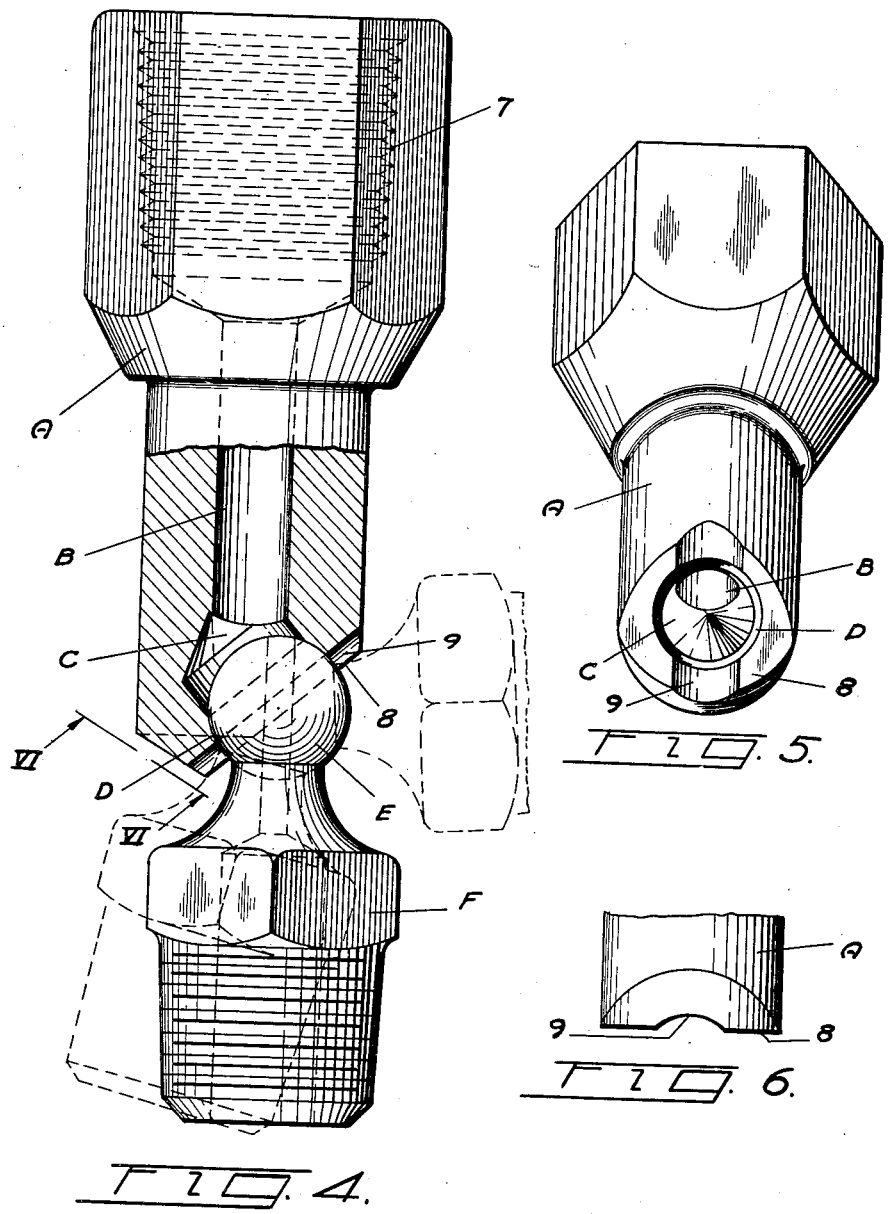

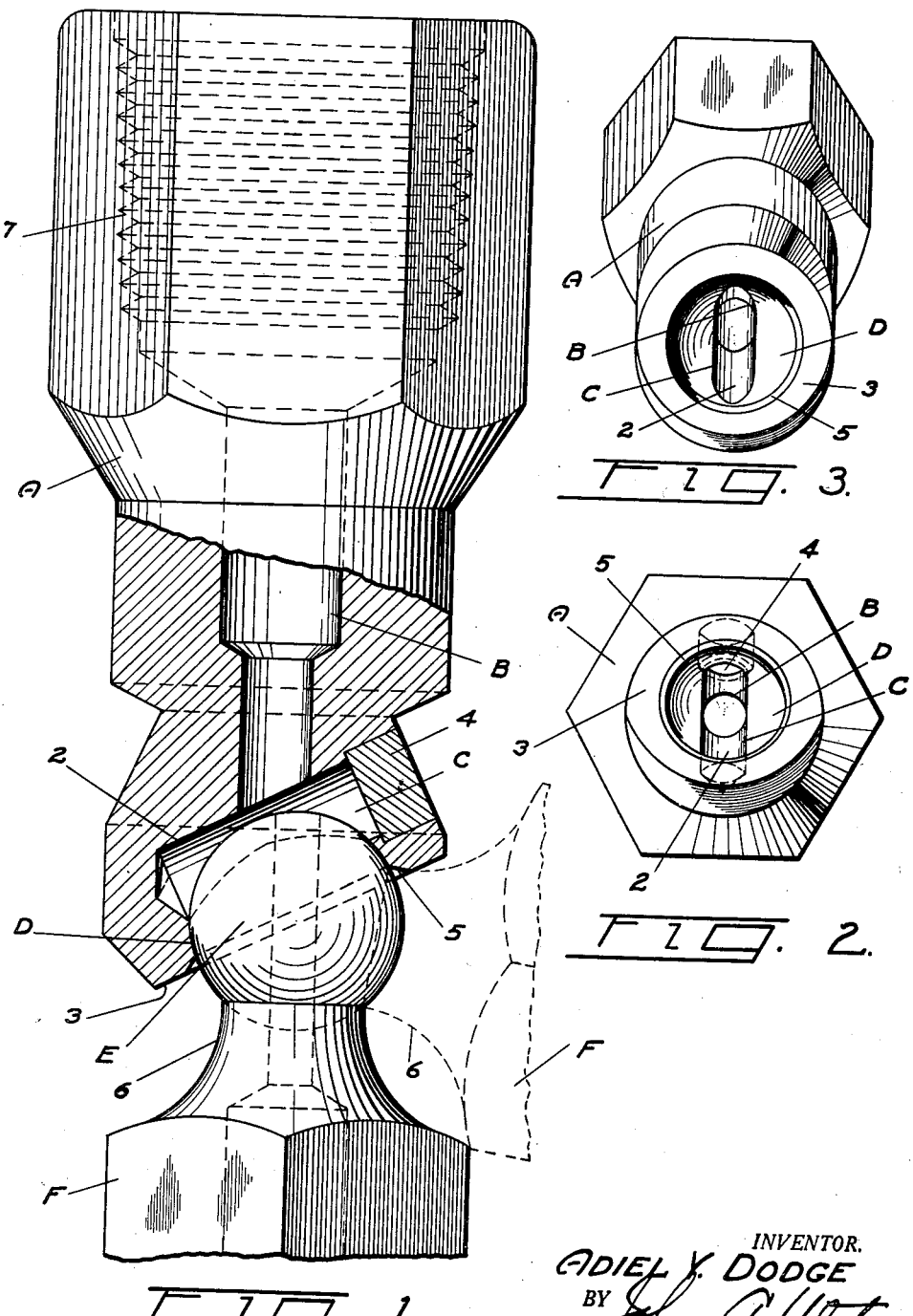

Patented Oct. 9, 1934

1,976,060

UNITED STATES PATENT OFFICE 1,976,060

LUBRICATING DEVICE

Adiel Y. Dodge, South Bend, Ind., assignor to The Lubrication Corporation, South Bend, Ind., a corporation of Delaware Application April 20, 1932, Serial No. 606,396

6 Claims. (Cl. 285—161)

This invention relates to lubrication devices and more particularly to lubricant discharge nozzles of the type wherein a lubricant tight seal may be effected between the discharge orifice of the nozzle and the lubricant port of a lubricant nipple or fitting by metal to metal contact between nozzle and fitting under manual pressure.

An object of the invention is to provide a lubricant nozzle incorporating means for permitting the movement of the nozzle over the spherical head of a lubricant fitting throughout a wide range of angular movement during a lubricant servicing operation without destroying the lubricant tight seal therebetween.

Another object is to provide a lubricant discharge nozzle wherein the range of angular movement between nozzle and fitting during operative engagement is increased and wherein the contacting surfaces between the nozzle and the fitting head are increased as well.

A further object is to provide a lubricant nozzle wherein the range of permissible angular movement between the nozzle and the head of the fitting during operative engagement is materially increased without materially decreasing the contacting surfaces therebetween.

Another object is to provide a lubricant discharge nozzle which is simple in construction and which may be manufactured at relatively low cost.

Other objects, the advantages and uses of the invention, will be, or should become apparent after reading the following description and claims and after consideration of the accompanying drawings forming a part of this specification, in which:

Fig. 1 is an enlarged elevation partly in section illustrating a lubricant discharge nozzle constructed in accordance with my invention;

Fig. 2 is a front end view of the nozzle illustrated in Fig. 1;

Fig. 3 is a plan view of the nozzle along the axis of its discharge orifice;

Fig. 4 is an enlarged elevation partly in section illustrating another form of my improved discharge nozzle;

Fig. 5 is a plan view of the nozzle of Fig. 4 along the axis of its discharge orifice; and Fig. 6 is a fragmentary view along the lines VI—VI of Fig. 4.

In general the lubricant discharge nozzles selected for illustration herein comprise a body A having a lubricant passage B therethrough, and a discharge orifice C having a fitting engaging contact surface D at the mouth thereof. The contact surface D is fashioned to conform to and engage with the outer surface of the spherical head E of a lubricant receiving nipple or fitting F of the general type illustrated and described in the United States patent to William L. Morris, Re. 18,278.

The nozzle illustrated in Figs. 1 to 3 has an elongated discharge orifice C formed by the intersection of a bore 2 in the body A with a recess defined by a concave spherical wall in the outer face 3 of the nozzle forming the fitting engaging contact surface D. The bore 2 lies on an axis perpendicular to the axis of the surface D and also communicates with the passage B. A plug 4 may be used to close the outer end of the bore 2 and may be secured in the bore by welding or by any other simple method as desired. The contour of the discharge orifice C is best shown in Fig. 3.

In providing an elongated discharge orifice, as shown in Fig. 3, I have considerably increased the range of angular movement of the nozzle over the head E of the fitting in one plane as compared with the range permissible in a nozzle having a circular discharge orifice surrounded by a contacting surface of the same area as the surface D. To accomplish this end with a circular orifice it would have to have a diameter equivalent to the longitudinal dimension of the orifice C as shown. However, if this were the case there would be an annular line of contact between the nozzle contact surface D and the head E of the fitting having a diameter nearly that of the diameter of the head thus subjecting a very large area of the head to lubricant under pressure tending to force the nozzle away from the fitting. The elongated orifice, greatly reduces the area of the fitting head against which the lubricant pressure may act so that the orifice may be of greater dimension in one plane than would be possible in an orifice of different proportional dimensions.

The periphery of the contact surface D where it joins the face 3 of the nozzle is beveled, as shown at 5, to eliminate sharp edges and to permit increase in the angular range of movement between nozzle and the fitting head during servicing by admitting the neck 6 of the fitting to that space within the face 3 provided by the beveling of the edge of the surface D so as to take advantage of the increased dimension in one plane of the orifice C. This is clearly illustrated in the dotted line position of the nipple in Fig. 1.

The rearward end of the passage B communicates with an internally threaded bore 7 by means of which the nozzle may be connected by threaded engagement with a lubricant conducting hose or, if desired, directly to a lubricant gun or similar lubricant dispensing apparatus.

The nozzle illustrated in Figs. 1 to 3, may be employed to service the lubricant fitting F under pressures greater than that normally employed with discharge nozzles of the contact type. This advantage is possible because of the relatively small surface of the fitting head exposed to the discharge orifice of the nozzle so that the forces tending to move the nozzle and fitting apart are relatively small. The range of angular movement of the nozzle over the spherical surface of the fitting head and about the center of the fitting head is in excess of 90° due to the increased dimension of the discharge orifice C in one direction.

In Figs. 4 to 6 another form of the discharge nozzle is illustrated wherein a substantial increase in the angular range of movement of the nozzle relative to the fitting is attained without materially decreasing the contacting surface. In this form of the nozzle the discharge orifice C is circular in contour and has a diameter less than that of the head E of the fitting F. A contacting surface D defined by a concave spherical wall surrounds the mouth of the orifice C and is fashioned to conform with the outer surface of the spherical head E. The increased range of the nozzle relative to the fitting head in one plane is attained by the provision of a recess 9 formed diametrically across the face 8 of the nozzle to intersect the surface D. The walls of the recess are defined by the revolution of a straight line about and parallel to an axis disposed perpendicular to the axis of the surface D.

In Fig. 4 I have shown the nozzle applied to the fitting F and in dotted lines the relationship of nozzle and fitting is shown wherein advantage is taken of the recess 9 to receive the neck of the fitting and thus increase the angular range of movement between the parts about the center of the fitting head.

It will be apparent that the recess 9 may be formed in the outer face of any type of contact nozzle constructed for contact seal with a spherical headed fitting or that a plurality of recesses may be formed if an increase in range is desired in more than one plane without revolving the nozzle about its longitudinal axis.

It is to be understood that the embodiments of the invention herein set forth are presented for the purpose of illustration only, and various changes may be made without departing from the spirit of the invention and the scope of the claims.

I claim:

1. A nozzle for servicing lubricant receiving fittings such as that described comprising, a tubular body having a lubricant passage therethrough, one end of said body being adapted for connection to a source of lubricant supply and the other end being provided with a lubricant fitting engaging contact surface defining a zone of a sphere, said body being further formed to provide an elongated recess intersecting said contact surface and said passage.

2. A nozzle, for servicing a lubricant receiving fitting having a spherical head, comprising, a tubular body adapted at one end for connection with a source of lubricant supply, and being formed at its other end with an elongated discharge orifice bounded by a concave spherical fitting contact surface having a diameter slightly greater than the longitudinal dimension of said discharge orifice.

3. A nozzle, for servicing a lubricant receiving fitting having a spherical head, comprising, a tubular body adapted at one end for connection with a source of lubricant supply, and being formed at its other end with an elongated discharge orifice bounded by a concave spherical fitting contact surface having a diameter slightly greater than the longitudinal dimension of said discharge orifice, that portion of said body between said contact surface and the outer face of the nozzle being beveled.

4. A nozzle for servicing a lubricant receiving fitting having a lubricant port as described, comprising, a tubular body adapted at one end for connection with a source of lubricant supply, and being formed at its other end with a lubricant fitting engaging contact surface defined by the revolution of an arcuate line about an axis, said body being further formed with a discharge orifice located within said contact surface, said orifice being of greater dimension in one direction than in another, and having its lesser dimension greater than the diameter of said lubricant port in said fitting.

5. A lubricant discharge nozzle comprising, a tubular body having a lubricant passage therethrough, one end of said body being adapted for connection to a source of lubricant supply and the other end being provided with a spherical lubricant fitting engaging contact surface, said body being further formed with a bore extending transversely of said passage and intersecting the passage and said contact surface.

6. A lubricant discharge nozzle comprising, a rigid metal tubular body having means for connecting one end of the body with a supply source of lubricant under pressure, said body being formed at its opposite end to provide a contact surface fashioned for intimate contact with a relatively large area of the outer surface of a spherical metal lubricant receiving fitting thereby to provide a metal to metal lubricant tight seal therebetween, said body being further formed with a lubricant outlet orifice communicating with the passageway through the body, said orifice being elongated laterally and having its perimeter lying within the confines of and contiguous with said contact surface.

ADIEL Y. DODGE.